(12) United States Patent
Brochard et al.

(10) Patent No.: US 12,104,557 B2
(45) Date of Patent: Oct. 1, 2024

(54) OUTPUT CONE OF AN AIRCRAFT PROPULSIVE ASSEMBLY FORMING AN ACOUSTIC TREATMENT SYSTEM WITH AT LEAST TWO DEGREES OF FREEDOM

(71) Applicant: Airbus Operations (S.A.S.), Toulouse (FR)

(72) Inventors: Wolfgang Brochard, Toulouse (FR); Florent Mercat, Toulouse (FR); Bastian Sabathier, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 189 days.

(21) Appl. No.: 17/126,109

(22) Filed: Dec. 18, 2020

(65) Prior Publication Data
US 2021/0215122 A1 Jul. 15, 2021

(30) Foreign Application Priority Data
Dec. 20, 2019 (FR) ........................................ 1915069

(51) Int. Cl.
*F02K 1/82* (2006.01)
*F02K 1/04* (2006.01)

(52) U.S. Cl.
CPC ................ *F02K 1/827* (2013.01); *F02K 1/04* (2013.01); *F05D 2260/963* (2013.01)

(58) Field of Classification Search
CPC ...... F02K 1/827; F02K 1/04; F05D 2260/963; G10K 11/172; G10K 11/161; B64D 33/06; F01N 1/023
See application file for complete search history.

(56) References Cited

U.S. PATENT DOCUMENTS

| | | | |
|---|---|---|---|
| 4,137,992 A * | 2/1979 | Herman | .................. F02K 1/827 |
| | | | 181/269 |
| 2007/0256889 A1 * | 11/2007 | Yu | ............................. F02K 1/04 |
| | | | 181/214 |

FOREIGN PATENT DOCUMENTS

| | | |
|---|---|---|
| EP | 2 407 659 A2 | 1/2012 |
| EP | 2 551 507 A2 | 1/2013 |
| EP | 3 839 238 A1 | 6/2021 |
| FR | 2 445 895 A1 | 8/1980 |
| FR | 2 914 020 B1 | 4/2009 |
| WO | WO 2007/130768 | 11/2007 |

OTHER PUBLICATIONS

French Search Report for Application No. 1915069 dated Aug. 21, 2020.
European Office Action for Application No. 20214711 dated Sep. 12, 2022.
European Office Action for Application No. 20214711.2 dated Jun. 4, 2021.

* cited by examiner

*Primary Examiner* — Woody A Lee, Jr.
*Assistant Examiner* — Eric A Lange
(74) *Attorney, Agent, or Firm* — KDW Firm PLLC (57) ABSTRACT

An output cone of an aircraft propulsive assembly extending in a general direction called longitudinal direction and including a front part and a rear part. The longitudinal assembly of the front part and rear part forms an acoustic treatment system with at least two degrees of freedom. Such a system allows for the treatment of several frequency ranges or of one wide frequency range by the treatment of several overlapping ranges.

7 Claims, 5 Drawing Sheets

OUTPUT CONE OF AN AIRCRAFT PROPULSIVE ASSEMBLY FORMING AN ACOUSTIC TREATMENT SYSTEM WITH AT LEAST TWO DEGREES OF FREEDOM

CROSS-REFERENCE TO RELATED APPLICATION

This application claims priority to French patent application number 19 15069 filed on Dec. 20, 2019, the entire disclosure of which is incorporated by reference herein.

TECHNICAL FIELD

The disclosure herein relates to the field of aircraft propulsive assemblies.

BACKGROUND

The commercial aircraft currently operated are propelled using propulsive assemblies, generally implanted under the wings of the aircraft or in the rear part of the fuselage thereof. Commercial aircraft are notably understood to be passenger or freight transport aircraft.

The propulsive assemblies employed in commercial aircraft are commonly turbojet engines, and more particularly turbofan engines.

Such a propulsive assembly comprises an engine comprising a turbomachine and which is installed in a nacelle. The turbomachine generally drives a fan situated at the intake (air inlet) of the propulsive assembly, the air flow taken in being able to be separated into two flows, namely a primary flow which is mixed with a fuel to be ignited and a secondary flow which circumvents the turbomachine and is accelerated in the propulsive assembly.

The combustion of the mix of the primary flow creates a pressure at the output of the turbine, an expansion of the gases and the acceleration thereof by venturi effect in a jet nozzle situated at the output of the propulsive assembly generating the kinetic energy allowing for the propulsion of the aircraft. The jet nozzle generally comprises an outer surface and an output cone, forming a central aerodynamic surface contributing to the acceleration of the gases at the output of the propulsive assembly.

One of the drawbacks of turbojet engines is their level of sound emissions. To reduce these sound emissions, it is known practice to provide certain internal surfaces of the nacelle, and certain surfaces of the casing of the turbomachine with coverings or panels that allow for acoustic absorption.

As an example, a conventional acoustic panel or covering generally comprises a honeycomb core interposed between a perforated sheet forming a first face and a solid sheet blocking the cells and forming a second face of the covering. The cells of the acoustic panels act as small so-called "quarter-wave" resonators allowing for the absorption of the acoustic waves over a given frequency range. It is recalled that a quarter-wave resonator corresponds to a cavity in which one of the three dimensions is very much greater than the other two, and that it allows for a damping of the acoustic wave in its propagation (unidirectional) in the cavity.

For a resonator to be effective, its absorption frequency range needs to include the frequency to which the panel is subjected. Now, the cavities of relatively small size of the acoustic panels correspond to high frequencies.
It is thus difficult to obtain a cellular pan& that is effective for certain applications subjected to low frequencies.

Now, the acoustic frequencies generated by the engine of an aircraft extend over a fairly wide range, including low frequencies which are not attenuated by conventional acoustic coverings (which are generally effective over ranges of between 1000 Hz and 5000 Hz, depending on the height of the cells). The low frequencies that have to be attenuated are, for example, the frequencies lying between 300 and 1000 Hz depending on the engine considered.

For the acoustic treatment of the low frequencies, is known practice to use devices having cavities of large dimensions, of the type referred to by the expression "deep cavity", and which are like or correspond to a Helmholtz resonator. Throughout this document, the term device of Helmholtz resonator type will be used to designate the acoustic devices of "deep cavity" type or cavity mode resonator, which comprise a cavity and generally a cross-section restriction at the input of the cavity, and which allow a damping of the acoustic waves according to a three-dimensional mode of propagation of the waves in the cavity (damping according to a so-called cavity mode).

The acoustic coverings that implement this technology are however complex to manufacture and to implement on surfaces of small dimensions or of complex geometry.

An effective sound-proofing of aircraft propulsive assemblies thus constitutes, generally, an important issue.

This issue is further reinforced by the latest technical and legal developments.

Indeed, the current trend is to lower the sound emissions accepted by the emissions standards applicable to aircraft.

Furthermore, the diameter of the propulsive assemblies tends to increase, in order to increase bypass ratio (ratio by weight between the secondary flow and the primary flow), which allows for a better energy efficiency of the engine. Propulsive assemblies with very high bypass ratio, for example greater than or equal to fifteen, are for example envisaged. Such engines have a nacelle of greater diameter than the diameters of the propulsive assemblies employed hitherto on commercial aircraft, but can be shorter (in its longitudinal dimension corresponding to the general direction of the air flow which passes through it) than the propulsive assemblies employed hitherto on commercial aircraft. That reduces the surfaces available for treating the acoustic emissions, and the adoption of propulsive units of large diameter tends to further lower the frequencies of the acoustic waves that they generate, while these low frequenciesare more complex to treat because the need to have cells of large volume to absorb low frequencies leads to panels of great thickness, that are incompatible with an aeronautical application.

While the outer surface of a jet nozzle sometimes forms an acoustic treatment surface, only an acoustic treatment at the inlet of the jet nozzle is provided, as disclosed for example in the document FR2914020. The disclosure herein aims to propose a jet nozzle output cone that allows for an enhanced acoustic treatment, notably in light of all or some of the issues described above.

SUMMARY

Thus, the disclosure herein relates to an output come of an aircraft propulsive assembly extending in a general direction called longitudinal direction and comprising a front part and a rear part. The longitudinal assembly of the front part and rear part forms an acoustic treatment system with at least two degrees of freedom.

The formation of an acoustic system with two degrees of freedom allows for acoustic frequencies to be treated over different frequency ranges or over a wide range of frequencies by overlap or continuity of the frequency ranges treated by the acoustic system.

The configuration of the output cone in two or more parts is exploited to constitute the acoustic treatment system.

The front part can comprise a longitudinal portion of the cone having curved surfaces that allow, from front to rear, an enlargement followed by a start of restriction of the cross-section of the cone, and the rear part is substantially conical or tapered.

The acoustic treatment system can comprise a quarter-wave device, comprising cells forming quarter-wave resonators, and a device of Helmholtz resonator type.

The quarter-wave device can be formed in one of the front part and rear part, or in each of the front part and rear part. The device of Helmholtz resonator type is then formed in one of the front part and rear part or by the assembly of the front part and rear part.

The device of Helmholtz resonator type can be formed entirely in the front part, and the quarter-wave device can be formed entirely in the rear part. The quarter-wave device can be formed entirely in the rear part and the device of Helmholtz resonator type can be formed partly in the front part and partly in the rear part, a portion of at least one cavity of the device of Helmholtz resonator type extending inside the cone under the quarter-wave device.

The device of Helmholtz resonator type can be wholly or partly in the front part, and the quarter-wave device can comprise at least one set of cells in the front part, the device of Helmholtz resonator type extending inside the cone under the set of cells of the quarter-wave device being in the front part.

The device of Helmholtz resonator type can comprise two sets of cells, namely a first set of cells situated entirely in the rear part, and a second set of cells situated entirely in the front part.

The front part can comprise a front resistive surface allowing acoustic waves to enter into one of the quarter-wave device and device of Helmholtz resonator type and the rear part can comprise a rear resistive surface allowing acoustic waves to enter into the other of the quarter-wave device and device of Helmholtz resonator type.

The disclosure herein relates also to an aircraft propulsive assembly comprising a turbojet engine comprising a jet nozzle comprising an output cone as previously described.

BRIEF DESCRIPTION OF THE DRAWINGS

Other particular features and advantages of the disclosure herein will become more apparent from the following description.

In the attached drawings, given by way of nonlimiting examples.

DETAILED DESCRIPTION

Figure 1:
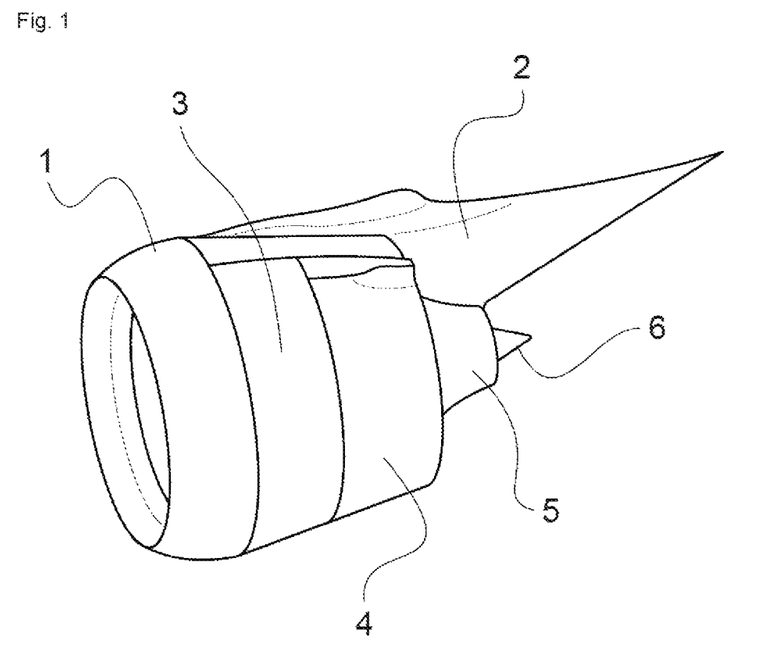
FIG. 1 represents, by a three-dimensional schematic view, an aircraft propulsive assembly.

FIG. 1 represents an aircraft propulsive assembly of a known type and that is commonly used to propel a commercial aircraft. The propulsive assembly represented by way of example is intended to be installed under the wings of the aircraft, and comprises a nacelle 1 intended to be linked to an aircraft by a support pylon 2. In the nacelle 1, an engine is installed. The engine is a turbomachine, namely a turbojet engine 3, generally of turbofan engine type. In this case, the jet nozzle comprises a secondary jet nozzle 4, for the ejection of the secondary flow, and a primary jet nozzle for the ejection of the primary flow from the turbojet engine. The disclosure herein relates to the primary jet nozzle, which is also simply referred to as "jet nozzle" in the present document. The jet nozzle comprises an outer surface 5, or "nozzle" and a cone 6 (or "plug").

Figure 2:
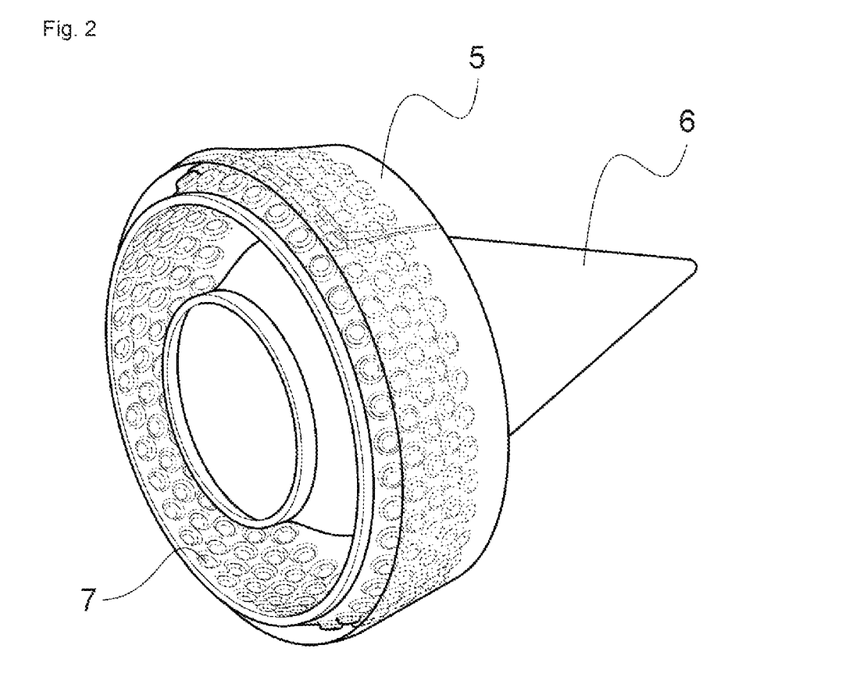
FIG. 2 represents, by a three-dimensional schematic view, an output jet nozzle of an aircraft propulsive assembly corresponding to the state of the art.

The (primary) output jet nozzle of the turbojet engine is represented in more detail in FIG. 2. The gases deriving from the combustion taking place in the turbojet engine are expelled between the outer surface 5 and the cone 6. These elements are configured to accelerate the gases at the output of the engine. That is made possible, notably, by the variable section defined between the outer surface 5 and the surface of the cone 6 (convergent/divergent).

As illustrated in FIG. 2, the outer surface 5, or nozzle of the jet nozzle, can be configured to constitute an acoustic treatment surface, and comprise cells allowing for a damping of the acoustic waves over a given frequency range.

For its part, according to the state of the art, the cone 6 constitutes a surface that is not exploited, or exploited only very basically, in reducing acoustic emissions.

Figure 3:
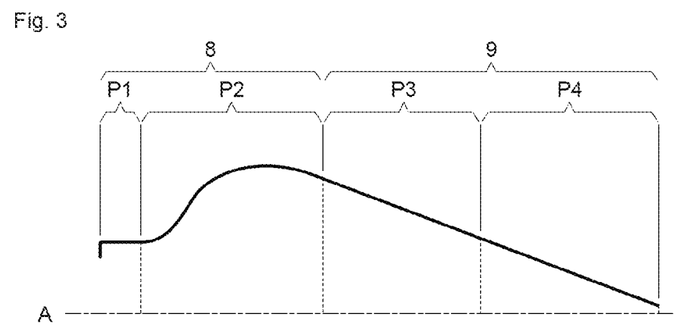
FIG. 3 represents, by a partial cross-sectional schematic view, an output cone of an aircraft propulsive assembly.

FIG. 3 represents an output code 6 of an aircraft propulsive assembly, by a half-cross-sectional view. The present half-view comprises an axis A of symmetry which is also the axis of rotation, or main axis, about which the surface of the cone is developed.

It is, generally, possible to define four longitudinal portions of the cone 6.

A first portion P1, situated at the front of the cone 6, corresponds to the flange for fixing the cone 6 to the engine, that is to say to the turbojet engine 3, that is equips. A second portion P2 has the curved surfaces of the cone which form an enlargement followed by a start of restriction of the cross-section. The first portion P1 and the second portion P2 form a front part 8 of the cone 6. The rest of the cone 6, of substantially conical or tapered form, constitutes a rear part 9 of the cone 6. The rear part 9 can be considered as the butt-jointing of a third tapered portion P3 and of a fourth portion P4 called rear cone.

Each of these portions can be formed, optionally, by a distinct physical component, these components being linked to one another by suitable circumferential links.

The cone that is the subject of the disclosure herein, several embodiments of which are presented with reference to the following figures, has the particular feature that the assembly of the front part 8 and the rear part 9 forms an acoustic treatment system with at least two degrees of freedom, that is to say having as many characteristic modes and frequencies as degrees of freedom.

Such a system therefore allows for the attenuation of the acoustic waves over several frequency ranges, situated around characteristic frequencies of the system. That makes it possible to treat several separate frequency ranges, or one wide frequency range by the treatment of several overlapping ranges.

Because of the respective functions of the portions of the cone 6, the surfaces of the cone that can be exploited to perform an acoustic treatment are the second portion P2 of the front part 8 and the third portion P3 of the rear part 9.

Thus, the cone 6 allows the treatment of at least two distinct frequency ranges. The frequency ranges damped by the cone 6 are typically treated by different acoustic devices, for example two devices respectively of quarter-wave type and of Helmholtz resonator type.

According to the technologies used, the acoustic devices present in the cone can be formed in a single piece or in several pieces.

The links between the portions of the cone, and between the acoustic treatment devices and the rest of the cone can be of various types: splices, riveted, glued or welded links, by brazing, etc.

The links between the constituent elements of the acoustic devices and the walls of the cone 6 can be produced by a seal of metal or ceramic type.

Figure 4:
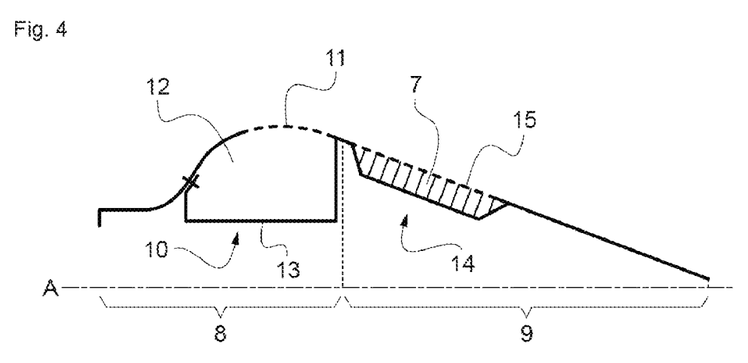
FIG. 4 represents, by a partial cross-sectional schematic view, a first variant of a first embodiment of the disclosure herein.

FIG. 4 presents, by a partial cross-sectional view similar to that of FIG. 3, an output cone of an aircraft propulsive assembly according to a first variant of a first embodiment of the disclosure herein.

According to this first embodiment, the front part 8 and the rear part 9 of the cone are composed of butt-jointed distinct parts.

The front part 8 comprises an acoustic treatment device of Helmholtz resonator type 10, allowing a damping of the acoustic waves by a cavity mode.

For that, the front part 8 comprises a perforated surface, or, more generally, a front resistive surface 11, allowing the acoustic waves to penetrate into a cavity 12. The front resistive surface can, in this embodiment and in any other embodiment, be formed by a perforated skin. As a nonlimiting example, the perforated skin can comprise holes having a diameter of between 0.3 mm and 3 mm. It can have, typically by way of example, an open surface ratio of between 4% and 25%; that is to say an open surface of between 4% and 25% of the total perforated surface. The perforated surface can extend over all the aerodynamic surface or be located in such a way that it extends only partially over the cavity 12 ("deep cavity") of the device of Helmholtz resonator type. The front resistive surface 11 is advantageously formed in the longitudinal second portion P2 of the cone 6. A plurality of cavities 12 of large dimensions (of "deep cavity" type) can be formed all around the output cone, that is to say about the axis A. The formation of such cavities benefits from the fact that they are formed, wholly or partly, in the second portion P2 where the section of the cone 6 widens.

Each cavity 12 is defined by the outer wall of the cone 6, and by an inner wall 13 which is added and fixed in the cone 6.

The rear part 9 comprises a quarter-wave acoustic treatment device 14. The rear part comprises a perforated surface or, more generally, a rear resistive surface 15, allowing the acoustic waves to penetrate into the cells 7 of the quarter-wave device 14. The rear resistive surface can be of the same type as the front resistive surface. The rear resistive surface 15 is advantageously formed in the longitudinal third portion P3 of the cone 6. The acoustic covering comprising the cells 7 allows an absorption of the acoustic waves over a range of different frequencies, generally over frequencies higher than those of the range treated by the device of Helmholtz resonator type 10 present in the front part 8.

Figure 5:
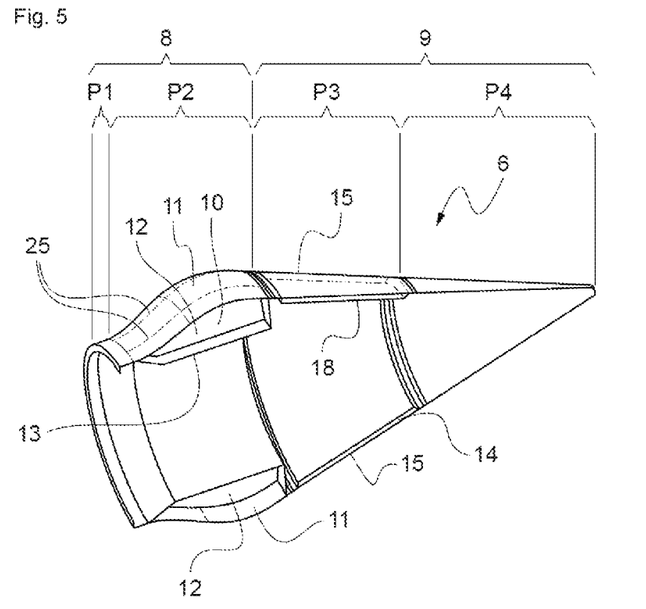
FIG. 5 represents, by a three-dimensional cross-sectional schematic view, an output cone of an aircraft propulsive assembly according to the embodiment of FIG. 4.

FIG. 5 represents the cone 6 according to the embodiment of FIG. 4. FIG. 5 notably shows the maximization of the acoustic treatment surfaces on the cone 6, on which only the first portion P1 (engine junction flange) and the fourth portion P4 (rear cone) do not form an acoustic treatment device. FIG. 5 also shows the longitudinal partitions 25 which delimit the cavities 12 of the device of Helmholtz resonator type. In the example represented, the third portion P3 is entirely formed by the quarter-wave device 14, such that the rear skin 18 of the quarter-wave device forms part of the flanges allowing the third portion P3 to be joined to the second portion P2 on the one hand, and to the fourth portion P4 on the other hand.

Figure 6:
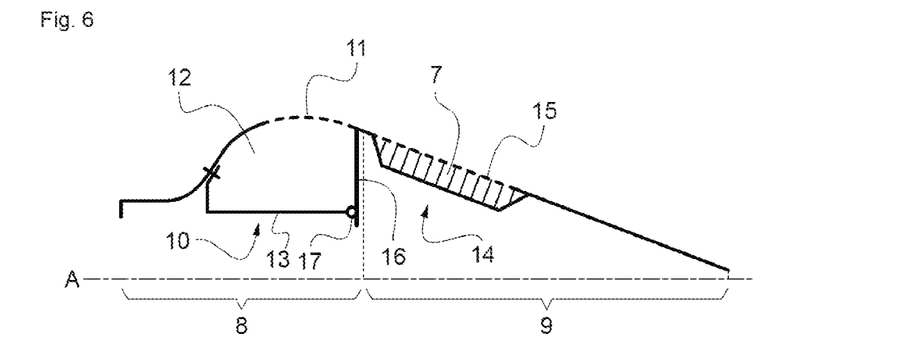
FIG. 6 represents, by a partial cross-sectional schematic view, a second variant of the first embodiment of the disclosure herein.

FIG. 6 represents a second variant of the first embodiment described with reference to FIG. 4. The embodiment of FIG. 6 differs from that of FIG. 4 in that the inner wall 13 partly defining the cavity 12 comprises a radial inner wall 16 which forms part of the rear part 9 of the cone. A seal 17 ensures the seal between the radial inner wall 16 and the rest of the inner wall 13 which forms part of the front part 8 of the cone 6. The seal 17 can notably be a metal or ceramic seal, suitable for withstanding high temperatures. This comment concerning the seal 17 concerns the present embodiment but also all the embodiments of the disclosure herein, notably those described hereinbelow, implementing such a seal. Similarly, a radial seal (not visible in FIG. 6, because of the cutting plane) ensures the seal between each longitudinal partition 25 and the radial inner wall 16. It is thus when the front part 8 and the rear part 9 are assembled together that each cavity 12 of the acoustic treatment device of Helmholtz resonator type 10 is formed. This variant can simplify the constitution of each of the front and rear parts, and if necessary increases the volume of the cavities 12.

Figure 7:
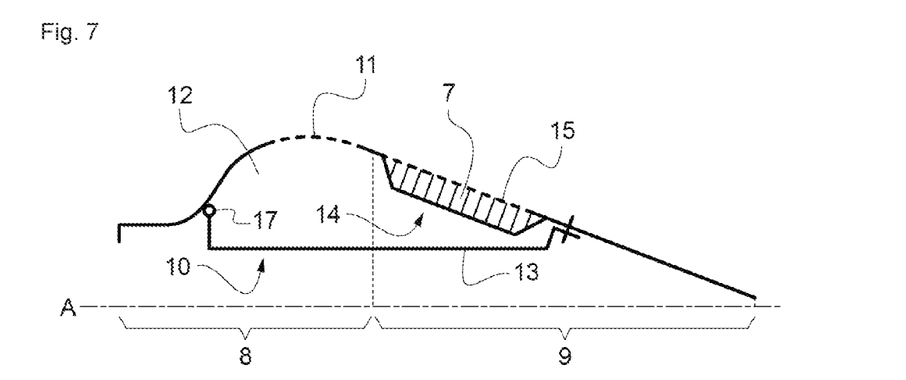
FIG. 7 represents, by a partial cross-sectional schematic view, a first variant of a second embodiment of the disclosure herein.

FIG. 7 illustrates a second embodiment, according to a first variant. By comparison to the first embodiment, the device of Helmholtz resonator type 10 extends not only in the front part 8, but also in the rear part 9 of the cone 6. The disposition and the construction of the quarter-wave device 14 is identical to that described for the first embodiment, with reference to FIGS. 4 to 6. The front resistive surface 11 emerging in the cavity 12 of the device of Helmholtz resonator type 10 can be configured as in the first embodiment. The cavity 12, for its part, extends not only in the front part 8 of the cone 6, but also in the rear part 9, under the quarter-wave device 14. "Under" the quarter-wave device is understood to mean "more toward the interior of the cone", that is to say in greater proximity to the axis A. For that, the inner wall 13 extends under the quarter-wave device 14, for example substantially parallel to the axis A, and is fixed toward the front to the front part 8, and at the rear to the rear part 9 behind the quarter-wave device 14. More specifically, in the example represented, the inner wall 13 forms part of the rear part, and a seal 17 ensures the seal between the inner wall 13 and the front part 8. Thus, the inner wall 13 is linked to the rear part before assembly between the front part 8 and the rear part 9 to form the cone 6. It is thus upon assembly between the front part 8 and the rear part 9 that each cavity 12 of the acoustic treatment device of Helmholtz resonator type 10 is formed. An inverse configuration (not represented) can obviously be envisaged, that is to say with an inner wall 13 forming part of the front part, before assembly of the front part 8 and of the rear part, a seal being able, in this case, to ensure the seal between the inner wall 13 and the rear part 9.

Such a configuration, according to the second embodiment, makes it possible to obtain a cavity 12 that is particularly long, of large volume, which lowers the frequency range treated.

Figure 8:
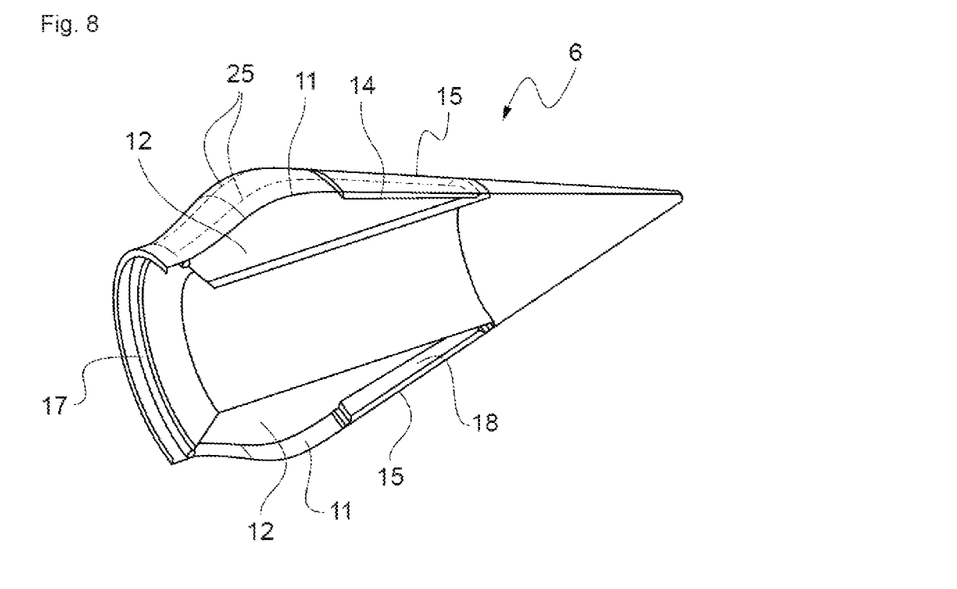
FIG. 8 represents, by a three-dimensional cross-sectional schematic view, an output cone of an aircraft propulsive assembly according to the embodiment of FIG. 7.

FIG. 8 represents the cone 6 according to the embodiment of FIG. 7, by a view similar to that of FIG. 5. In the embodiment represented, the junction zone between the fourth portion P4 (rear cone) and the third portion P3 of the cone 6 is also a common junction zone for the rear part of the quarter wave device 14 and for the rear end of the inner wall 13. FIG. 7 also shows a possible configuration of the seal 17 fixed to the front of the inner wall 13 to guarantee the seal of the cavity 12 once the latter is formed by assembly of the second portion P2 with the third portion P3.

FIG. 8 notably shows the maximization of the acoustic treatment surfaces on the cone 6, of which only the first portion P1 (flange for joining to the engine) and the fourth portion P4 (rear zone) do not form an acoustic treatment device. In the example represented, the third portion P3 is entirely formed by the quarter-wave device 14, such that the rear skin 18 of the quarter-wave device forms part of the flanges allowing the third portion P3 to be joined to the second portion P2 on the one hand, and to the fourth portion P4 on the other hand.

Figure 9:
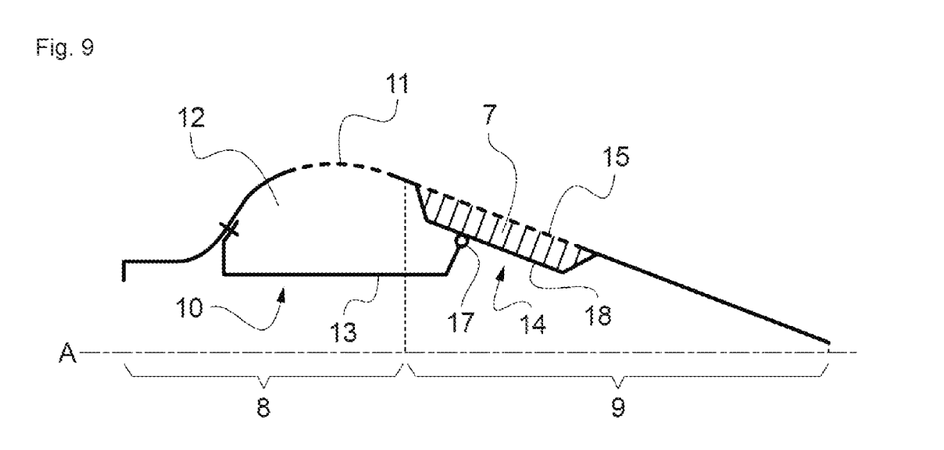
FIG. 9 represents, by a partial cross-sectional schematic view, a second variant of the second embodiment of the disclosure herein.

FIG. 9 represents a second variant of the second embodiment. Just as in the first variant, the device of Helmholtz resonator type 10 extends not only in the front part 8, but also in the rear part 9 of the cone 6. This variant is distinguished from that of FIG. 7 in that the inner wall 13 is not linked to the wall of the cone 6 behind the quarter-wave device 14, but is linked to the quarter-wave device 14. More particularly, the inner wall 13 forms part of the front part 8 to which it is linked before assembly between the front part 8 and the rear part 9 in order to constitute the cone 6. A seal 17 ensures the seal between the inner wall 13 and the rear part 9, namely between the inner wall 13 and the rear skin 18 of the quarter-wave device 14. Similarly, a second seal (not visible in FIG. 6, because of the cutting plane) ensures the seal between each longitudinal partition 25 and the rear part 9, namely between each longitudinal partition 25 and the rear skin 18 of the quarter-wave device.

Figure 10:
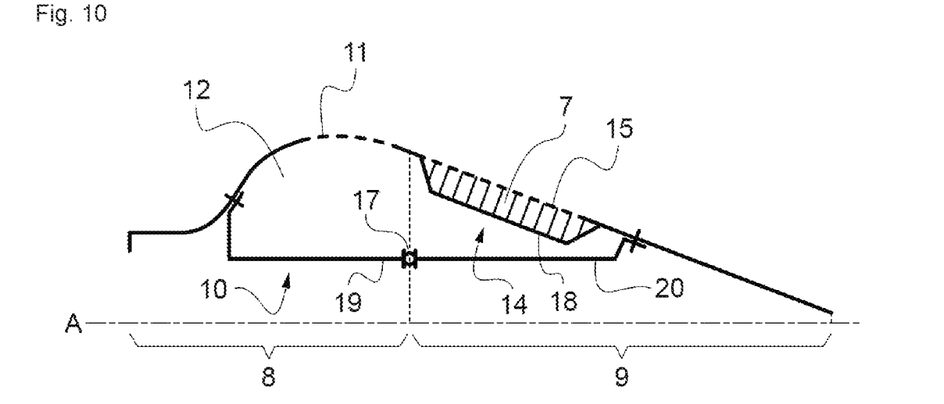
FIG. 10 represents, by a partial cross-sectional schematic view, a third embodiment of the disclosure herein.

FIG. 10 represents a third embodiment of the disclosure herein. This embodiment comprises a device of Helmholtz resonator type 10 and a quarter-wave device that can be identical or very similar to those of FIG. 7. In particular, the cavity 12 of the device of Helmholtz resonator type 10 extends in the front part 8 and in the rear part 9 under the quarte ave device 14. By comparison to the embodiment of FIG. 7, the inner wall forming (with the wall of the cone and the rear skin 18 of the quarter-wave device) the cavity 12 is formed in two parts, namely a front inner wall 19 which forms part of the front part 8, and a rear inner wall 20 which forms part of the rear part 9.

The free end at the rear of the front inner wall 19 can be situated substantially in the same transverse plane (orthogonal to the axis A) as the rear end of the front part 8, and the free end of the rear inner wall 20 can be situated substantially in the same transverse plane as the front end of the rear part 9, such that the front inner wall 19 and rear inner wall 20 are butt-jointed in this plane upon the assembly of the cone 6. A seal 17 is interposed between the front inner wall 19 and rear inner wall 20 to ensure the seal at this level of the cavity 12. Each longitudinal wall 25 is advantageously formed in two parts, namely a front longitudinal wall formed in the front part 8 and a rear longitudinal wall formed in the rear part 9. In this case, a radial seal (not visible in FIG. 10 because of the cutting plane) is interposed between each front longitudinal wall and the corresponding rear longitudinal wall.

This configuration offers a cavity 12 that has a volume, and in particular a length, that is significant. It also offers a construction that offers logistical advantages, because no part protrudes longitudinally from the constituent elements of the cone before assembly. Lastly, it offers advantages upon assembly of the cone, all the lines of assembly between the front part 8 and the rear part 9 being gathered together in the same plane.

Figure 11:
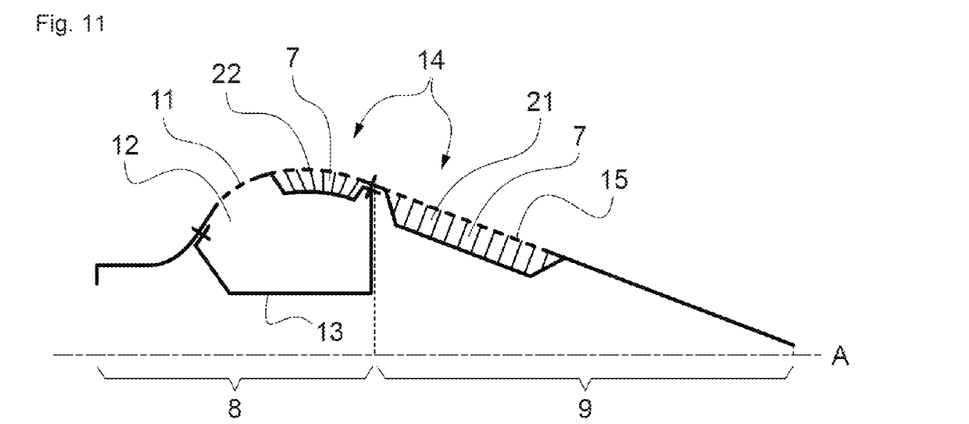
FIG. 11 represents, by a partial cross-sectional schematic view, a first variant of the fourth embodiment of the disclosure herein.

FIG. 11 represents a first variant of a fourth embodiment of the disclosure herein. This embodiment is similar to that of FIG. 1, from which it differs essentially through the presence of a part of the quarter-wave device in the front part 8. The quarter-wave device 14 thus comprises a first set of cells 21 situated in the rear part 9, as in the embodiments previously described. The quarter-wave device 14 further comprises a second set of cells 22 situated in the front part 8. The cells of the second set of cells 22 can be identical to or different from the cells of the first set of cells 21. Notably, the cells of the second set of cells can be of larger or smaller dimensions than those of the first set of cells, in order to respectively treat lower or higher frequency ranges.

The front resistive surface 11 can be common to the second set of cells 22 and to the cavity 12 and can, in this case, be more extensive than the front resistive surface of the embodiments previously described.

The second set of cells 22 can be continuous over the circumference of the cone 6. In this case, the longitudinal walls 25 are advantageously fixed to the rear skin of the second set of cells 22. The second set of cells 22 can, alternatively, be discontinuous, and in this case the longitudinal walls 25 can divide up the second set of cells 22 and extend to the surface of the cone 6.

The inner wall 13 is linked to the wall of the cone 6 and/or to the rear skin of the second set of cells 22.

Figure 12:
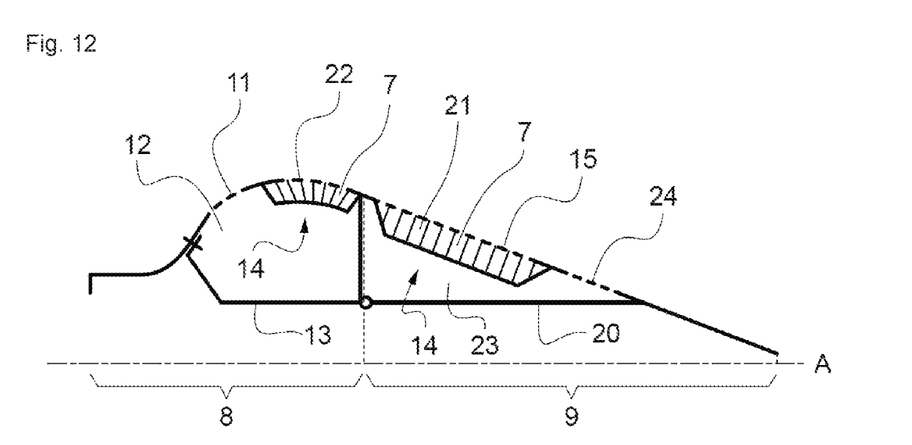
FIG. 12 represents, by a partial cross-sectional schematic view, a second variant of the fourth embodiment of the disclosure herein.

FIG. 12 represents a second variant of the fourth embodiment of the disclosure herein. This second variant differs from that of FIG. 11 in that a device of Helmholtz resonator type is formed in the rear part 9. To this end, a rear inner wall 20 forming part of the rear part 9 is fixed on the one hand to the wall of the cone 6, behind the first set of cells 21 and, on the other hand, to the inner wall 13 which forms a closed cavity 12 in the front part 8. A second cavity 23 is thus formed in the rear part 9. The acoustic waves can penetrate into this second cavity 23 through an additional resistive surface 24 formed behind the rear resistive surface 15, or by any other outward opening of the cone.

The disclosure herein thus developed allows an output cone of an aircraft propulsive assembly to be obtained that offers important acoustic properties. In particular, by virtue of the formation of an acoustic treatment system with several degrees of freedom, it is possible to treat different frequency ranges, which makes it possible to treat sound emissions from distinct sources, or even to obtain an acoustic treatment over a wide range of frequencies by configuring the different acoustic treatment devices so that they treat adjacent or overlapping frequency ranges.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An output cone of an aircraft propulsive assembly extending in a general direction called longitudinal direction and comprising a front part and a rear part,
wherein the longitudinal assembly of the front part and rear part forms an acoustic treatment system with at least two degrees of freedom and comprising:
a quarter-wave device formed entirely in the rear part, wherein the quarter-wave device is defined between an outer wall of the cone and a rear skin spaced apart from the outer wall of the cone; and
a device of Helmholtz resonator type defined in an outer annular space between the outer wall of the cone and an inner wall positioned between the outer wall of the cone and a central axis of the cone, wherein the inner wall extends between and is linked to the outer wall of the cone in the front part and to the rear skin of the quarter-wave device such that a portion of at least one cavity of the device of Helmholtz resonator type extends inside the cone under a first portion of the quarter-wave device and a second portion of the quarter-wave device extends rearward beyond the device of Helmholtz resonator type, wherein the device of Helmholtz resonator type is formed partly in the front part and partly in the rear part.

2. The output cone of an aircraft propulsive assembly according to claim 1, wherein the front part comprises a longitudinal portion of the cone having curved surfaces allowing, from front to rear, an enlargement followed by a start of restriction of a cross-section of the cone, and the rear part is substantially conical or tapered.

3. The output cone of an aircraft propulsive assembly according to claim 1, wherein the acoustic treatment system comprises a quarter-wave device, comprising cells forming quarter-wave resonators, and a device of Helmholtz resonator type.

4. The output cone of an aircraft propulsive assembly according to claim 1, wherein the device of Helmholtz resonator type is wholly or partly in the front part, and wherein the quarter-wave device comprises at least one set of cells in the front part, the device of Helmholtz resonator type extending inside the cone under the set of cells of the quarter-wave device being in the front part.

5. The output cone of an aircraft propulsive assembly according to claim 1 wherein the device of Helmholtz resonator type comprises two sets of cells, comprising a first set of cells situated entirely in the rear part, and a second set of cells situated entirely in the front part.

6. The output cone of an aircraft propulsive assembly according to claim 3, wherein the front part comprises a front resistive surface allowing acoustic waves to enter in one of the quarter-wave device and device of Helmholtz resonator type and the rear part comprises a rear resistive surface allowing acoustic waves to enter into the other of the quarter-wave device and device of Helmholtz resonator type.

7. An aircraft propulsive assembly comprising a jet engine comprising a jet nozzle comprising an output cone according to claim 1.

* * * * *